United States Patent
Birchbauer et al.

(10) Patent No.: US 11,017,228 B2
(45) Date of Patent: May 25, 2021

(54) METHOD AND ARRANGEMENT FOR CONDITION MONITORING OF AN INSTALLATION WITH OPERATING MEANS

(71) Applicant: Siemens Aktiengesellschaft, Munich (DE)

(72) Inventors: Josef Alois Birchbauer, Seiersberg (AT); Philipp Glira, Gänserndorf (AT); Olaf Kähler, Graz (AT); Bernd Koppenhöfer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/493,078

(22) PCT Filed: Mar. 13, 2018

(86) PCT No.: PCT/EP2018/056146
§ 371 (c)(1),
(2) Date: Sep. 11, 2019

(87) PCT Pub. No.: WO2018/167006
PCT Pub. Date: Sep. 20, 2018

(65) Prior Publication Data
US 2020/0074176 A1  Mar. 5, 2020

(30) Foreign Application Priority Data
Mar. 15, 2017 (EP) ..................... 17161027

(51) Int. Cl.
*G06K 9/00* (2006.01)
*B64C 39/02* (2006.01)
*G05D 1/10* (2006.01)

(52) U.S. Cl.
CPC ........ *G06K 9/00637* (2013.01); *B64C 39/024* (2013.01); *G05D 1/101* (2013.01); *B64C 2201/127* (2013.01)

(58) Field of Classification Search
None
See application file for complete search history.

(56) References Cited

U.S. PATENT DOCUMENTS

2012/0027298 A1* 2/2012 Dow ................. G01C 5/00
382/173
2017/0336806 A1* 11/2017 Blanc-Paques ....... G08G 5/045
(Continued)

FOREIGN PATENT DOCUMENTS

| EP | 1548908 A1 | 6/2005 |
|----|------------|--------|
| EP | 2902319 A1 | 8/2015 |
| WO | 2016149513 A1 | 9/2016 |

OTHER PUBLICATIONS

PCT International Search Report and Written Opinion of International Searching Authority dated Mar. 7, 2018 corresponding PCT International Application No. PCT/EP2018/056146 filed Mar. 13, 2018.

(Continued)

*Primary Examiner* — William B Perkey
(74) *Attorney, Agent, or Firm* — Wolter Van Dyke Davis, pllc

(57) ABSTRACT

A method for condition monitoring of an installation with operating devices, in which overview data is detected by a first vehicle with an overview sensor arrangement for optical detection of the facility, and the operating devices are identified in the overview data by an evaluation device and the positions of the operating devices are determined taking into account the position of the first vehicle. Detail shots of the operating devices are produced by a detail camera on-board a second or the first vehicle, which is oriented in (Continued)

relation to the respective positions of the operating devices. There is a corresponding arrangement for carrying out the method. A mode of embodiment relates to the condition monitoring of high-voltage masts with high-voltage free lines that are clamped between the masts. Insulators hang on the transverse members as operating devices.

23 Claims, 4 Drawing Sheets

(56) References Cited

U.S. PATENT DOCUMENTS

| | | | | |
|---|---|---|---|---|
| 2018/0158236 | A1* | 6/2018 | Priest | G01B 11/24 |
| 2018/0232871 | A1* | 8/2018 | Terry | H04W 24/10 |
| 2018/0357788 | A1* | 12/2018 | Li | G06T 7/593 |
| 2019/0130181 | A1* | 5/2019 | Pittman | G06K 9/4604 |
| 2019/0130768 | A1* | 5/2019 | Clark | G06K 9/00637 |
| 2019/0205644 | A1* | 7/2019 | Birchbauer | G05D 1/104 |
| 2019/0212741 | A1* | 7/2019 | Lee | G01R 29/0892 |
| 2019/0276146 | A1* | 9/2019 | Koivuranta | B64C 39/024 |

OTHER PUBLICATIONS

"Phase One Aerial Cameras—Fully Integrated Aerial Photography Solutions" PhaseOne Industrial, Brochure, available from https://www.gim-international.com/files/72a1c4591d111d-d1c17a3d3365ae10a4.pdf.

Hackel, Timo; Jan D. Wegner, Konrad Schindlar; "Fast Semantic Segmentation of 3D Point Clouds with Strongly Varying Density", Photogrammetry and Remote Sensing, ETH Zürich; Jun. 2016; DOI: 10.5194/isprsannals-lll-3-177-2016.

Wikipedia: Kettenlinie (Mathematik) Publication Sep. 3, 2017 Retrieved from https://de.wikipedia.org/wiki/Kettenlinie_(Mathematik) Mar. 11, 2020; English Machine Translation "Wikipedia: Chain line (math)" attached.

Ren, Shaoqing; Kaiming He, Ross Girshick, Jian Sun; "Faster R-CNN: Towards Real-Time Object Detection with Region Proposal Networks"; Microsoft Research; Submitted on Jun. 4, 2015 (v1); arXiv:1506.01497.

"IGI UrbanMapper" Brochure; available from Web: https://www.igi-systems.com/files/IGI/Brochures/DigiCAM/IGI_UrbanMapper.pdf.

Waldhauser, Christoph; Ronald Hochreiter, Johannes Otepka, Norbert Pfeifer, Sajid Ghuffar, Karolina Korzeniowska, Gerald Wagner; "Automated Classification of Airborne Laser Scanning Point Clouds"; Springer Proceedings in Mathematics & Statistics vol. 97: 269-292. Apr. 2014; DOI: 10.1007/978-3-319-08985-0_12.

Redman, Joseph; Santosh Divvala, Ross Girshick, Ali Farhadi; "You Only Look Once: Unified, Real-Time Object Detection", CVPR; Proceedings of the IEEE conference on computer vision and patern recognition, pp. 779-788, 2016.

Wolf, D.; Prankl, J. and Vincze, M., "Fast semantic segmentation of 3D point clouds using a dense CRF with learned parameters," 2015 IEEE International Conference on Robotics and Automation (ICRA), Seattle, WA, 2015, pp. 4867-4873, doi: 10.1109/ICRA.2015. 7139875, 2015.

Shan, J. and Toth, C. "Topographic laser ranging and scanning: principles and processing", Chapter 2, pp. 29-85; CRC Press; Boca Raton, FL, 1st edition, 2008.

* cited by examiner

METHOD AND ARRANGEMENT FOR CONDITION MONITORING OF AN INSTALLATION WITH OPERATING MEANS

CROSS REFERENCE TO RELATED APPLICATIONS

This application is the US National Stage of International Application No. PCT/EP2018/056146 filed 13 Mar. 2018, and claims the benefit thereof. The International Application claims the benefit of European Application No. EP17161027 filed 15 Mar. 2017. All of the applications are incorporated by reference herein in their entirety.

FIELD OF INVENTION

The invention relates to a method and apparatus for monitoring a condition of an installation.

BACKGROUND OF INVENTION

Infrastructures, for instance high-voltage lines, wind turbines or bridge structures, usually have large dimensions. High-voltage masts having mast heights around 100 m are not unusual. A visual inspection by trained personnel, partially with the use of an optical magnification aid, for example binoculars, does not satisfy the requirement of continuous and verifiable documentation and can generally be performed only here and there with a reasonable amount of effort. Furthermore, a temporal progression analysis of damage within the scope of detection of changes between different measurement times is not possible.

If the intention is to carry out automated image capture of operating means, for instance insulators, on high-voltage overhead power lines, it must currently be ensured, within the scope of a visual inspection and appraisal, that surface details which reveal minor damage are also captured. A high image resolution is required for this purpose. With the current level of camera technology, it is not possible to use a single camera to simultaneously both capture the entirety of the installation and achieve the required surface resolution.

Whereas it appears to be possible to sequentially fly over individual height regions, for instance in the case of vertical structures such as wind turbines, this is uneconomical with respect to flight management in the case of line structures such as high-voltage lines since line networks must be captured to an extent of hundreds of kilometers.

Flying over high-voltage lines or other installations by means of laser scanning devices (so-called LIDAR, in particular "airborne laser scanning" (ALS)) and image recording (aerial photography) with subsequent visual inspection by an engineer have been common practice for more than a decade. Within the scope of the invention, the term "aerial photo" is used synonymously with the term "aerial image". In the case of the full-format recording of aerial images, cameras having up to 100 megapixels are currently available. For example, aerial cameras of the type iXU/iXU-RS 1000 are known from the product brochure "Phase One Aerial Cameras, Fully integrated Photography Solutions" from PhaseOne Industrial, Roskildeej 39, DK-2000 Frederiksberg, Denmark, http://industrial.phaseone.com/iXU_camera_system.aspx. However, reflected in the overall height of the infrastructure, the use of such a camera does not result in resolutions which allow detection of subtle surface changes, for example traces of powder, cracks or instances of paint chipping off, in the mm range. Therefore, there is no known possible way of providing detailed images of the operating means to be monitored with sufficient resolution without a trained engineer.

The publication by Christoph Waldhauser et al., "Automated Classification of Airborne Laser Scanning Point Clouds", Springer Proceedings in Mathematics & Statistics, Vol. 97, pages 269-292, September 2014, discloses the practice of using an aircraft to capture objects on the ground using a laser scanning device in the form of a point cloud data set. Furthermore, the authors Jie and Toth describe, in "Topographic laser ranging and scanning: principles and processing", published by CRC press, 2008, the practice of recording objects under a (manned or unmanned) flight platform in the form of a so-called 3-D point cloud by means of airborne laser scanning (ALS) from said platform.

SUMMARY OF INVENTION

On the basis of known methods for capturing high-resolution aerial photos of installations, the invention is based on the object of specifying automated method which can be used to monitor the condition of an installation in a comparatively fast and cost-effective manner.

The invention achieves this object by means of a method as claimed.

The aim is to use the images from the detail camera to carry out an assessment in order to detect damage to the installation which is monitored with respect to its condition. This assessment of the detailed images can be carried out manually by an engineer in a control center, for example, or by machine using suitable software. Machine preprocessing and subsequent manual evaluation are also possible. If damage to an insulator on an overhead power line is detected, for example, a repair can be initiated before the operating means fails. This increases the availability of the installation and of the entire energy network and thus saves costs of failures. In addition, costly manual inspections of the installation, for instance of an overhead power line, are dispensed with.

Since the overview sensor arrangement captures the entire infrastructure or installation, individual infrastructure elements (for example insulators) are still resolved relatively coarsely therein, for example in a point cloud data set and an image data set. Details of these infrastructure elements cannot yet be discerned in these images. Within the scope of the invention, the term "point cloud data set" denotes a 3-D point cloud obtained using a laser scanning device.

As the detail camera, it is possible to use, for example, a camera which can create aerial photos from a distance of several dozen to a few hundred meters, which is typical of a flyover, said aerial photos making even minor damage in the mm range discernible. In comparison with an overview camera for example, a comparatively longer focal length, that is to say a telephoto lens, can be used for this purpose. For example, such damage may be a 2.5 cm long crack in an insulator shield.

It is particularly advantageous to use a color camera. It is also advantageous if the camera is mounted in a rotatable and pivotable manner in order to allow accurate orientation with respect to the determined positions of the operating means. In this case, the detail camera can be advantageously tracked during the movement of the vehicle along the installation in such a manner that motion blur of the detailed images is counteracted. For this purpose, the speed and direction of the vehicle can be determined on the basis of a temporally accurate determination of the position of the vehicle. The detail camera may be in the form of a high-resolution camera. On account of the image section which is far smaller in comparison with an overview camera, the resolution of the detail camera can possibly be selected to be even lower than the resolution of an overview camera.

As a suitable position determination device, it is possible to use, for example, a satellite-based position determination, for example by means of GPS or Galileo, in the vehicle. A position in the sense of the invention does not always indicate the geographical longitude and latitude, but also the height (for example above sea level). In this case, a temporally accurate position determination, in particular an ms-accurate position determination, is possible, for example, if the vehicle moves along the installation. It is advantageous if the position determination device can determine the position with a resolution of less than one meter. In this case, the so-called GNSS/RTK system is more accurate than GPS.

The evaluation device can be provided with conventional computer devices and data memories, for example. It may be provided on board the vehicle or centrally in a control center.

As the vehicle, it is possible to use, for example, a truck which drives along an overhead power line on a road. However, the vehicle may also be an aircraft such as an airplane, a helicopter or the like. Aerial photos result in the case of an aircraft. The vehicle may be operated in a manned or unmanned manner, possibly in an autonomously driving manner.

The important advantage of the method according to the invention over the previous solutions lies in the automation of the recording process. The infrastructure elements of interest are first of all automatically located and are then automatically recorded in detail. Overview and detailed images are skillfully combined in order to obtain a complete overview of the infrastructure. Potentially particularly relevant regions are selectively captured in a higher detail resolution, which allows differentiated analyses and appraisals.

The camera "IGI Urban Mapper", IGI mbH, Langenauer Str. 46, D-57223 Kreuztal, "www.IGI-SYSTEMS.com", is indeed known from the brochure of the same name and was developed for creating three-dimensional urban images. However, in order to capture an infrastructure such as an overhead power line with operating means, a plurality of cameras would have to be combined in order to capture an entire mast, for example. This is comparatively very expensive and, with an accordingly high weight and space requirement, imposes high demands on an aircraft.

As an alternative to the invention, it would also be possible to use a high-resolution line scan camera, but this would entail the problem of orienting the recorded image lines with respect to one another in an extremely accurate manner since otherwise distortions are induced. In summary, it can be stated that the previous approaches are not suitable for the application of the automated monitoring of an infrastructure with a large vertical and horizontal extent, for example an overhead power line.

In one embodiment of the method according to the invention, a laser scanning device for capturing a point cloud data set is used for the overview sensor arrangement. A laser scanning device is, for example, a LIDAR system, as is used in (partially) autonomous motor vehicles in order to obtain three-dimensional models of the environment of the vehicle. The laser respectively measures distance values between the sensor and objects in the environment, with the result that a point cloud data set arises from a multiplicity of measurements. If the position of the sensor or of the vehicle is known, the position of a point from the point cloud data set can be reconstructed very accurately by referring to the position of the laser scanning device or of the flying object and the direction, with respect to which the laser scanning device is oriented. In dynamic measurement methods, for example mobile laser scanning (MLS) or airborne laser scanning (ALS), laser scanners are used together with a GNSS/INS system (Global Navigation Satellite System or Inertial Navigation System). This is used to determine a vehicle trajectory in order to capture the environment of the vehicle in the form of a 3-D point cloud. If the relative orientation between the GNSS/INS system and the laser scanner is known, a 3-D point cloud can be generated by combining the vehicle trajectory and the laser scanning measurements (distance and directions).

In this case, it is useful to use the laser scanning device to capture the entire vertical dimension of the installation, that is to say over the entire height of a mast, for example. Laser scanning devices are typically nowadays always used when monitoring a condition of an installation by means of an aircraft because the sagging of a line and the distance between a line and the ground can also be captured using said device. In addition, it is possible to monitor how close vegetation comes to the installation, that is to say whether trees or bushes, for example, are growing up toward an overhead power line.

In one embodiment of the method according to the invention, an overview camera for capturing an image data set is used for the overview sensor arrangement. As the overview camera for capturing an image data set, it is possible to use a camera which, owing to the design, possibly as a result of a suitable magnification mechanism or a corresponding lens, can image a similarly large section of the environment of the vehicle as the laser scanning device. The resolution should be sufficient for making objects of a size of a few cm to dm discernible, at least in outlines. These may be, for example, operating means such as insulators or else foreign bodies such as birds' nests. A wide-angle lens is advantageously used for the overview camera.

It is also advantageous if the overview camera is oriented in substantially the same manner as the laser scanning device if it is likewise used in the overview sensor arrangement. This can be achieved, for example, by arranging the laser scanning device and the overview camera together on a fastening apparatus, with the result that they always point in the same direction. The orientation of the laser scanning device and of the overview camera and, when using a common fastening device, the orientation of the fastening device can be determined, if a vehicle is used, with respect to the vehicle, with the result that it is not possible to change the "viewing direction" during data collection. Alternatively, a viewing direction which can be changed during data collection can be achieved by mounting the fastening device or the two individual sensors—the laser scanner and the overview camera—in a rotatable and pivotable manner, with the result that, if a flying object is used as the vehicle for example, it becomes possible to set the direction relative to the flying direction or to a flight trajectory known from previous flight planning by means of electric motors or the like.

As an alternative to a substantially identical orientation of the laser scanning device and the overview camera, it is possible to use a laser scanning device which is designed for a comparatively large direction range of 330°, for example. This makes it possible for the laser scanning device to always collect sufficient 3-D point cloud data even without being matched to the viewing direction of an overview camera in order to combine said data with image recordings from a camera.

The orientation of the laser scanning device and/or overview camera can be selected, for example, with respect to a longitudinal axis through the flying object in such a manner that, if the flying object flies straight ahead, that is to say in a straight line and parallel to the Earth's surface, the result is a viewing angle which is oriented obliquely downward (for example between 30° and 70° with respect to the Earth's surface). This has the advantage that an installation arranged over a large area, for example an overhead power line, can be easily captured. Furthermore, the orientation may be effected in such a manner that the viewing angle is tilted to one side of the flight trajectory, with the result that an angle of between 30° and 70° with respect to the Earth's surface results to the right or left, for example. This has the advantage that the operating means and other objects are recorded from the side instead of directly from above, as a result of which the three-dimensional shape can be discerned in an improved manner and the objects can be easily assigned. For example, during a flyby with an oblique viewing angle, an insulator appears, to a first approximation, as a tube between the mast and the overhead power line. In contrast, directly from the front, an insulator appears only as a rectangle and, directly from above, only as a circle.

If an overview camera and a laser scanning device are used together, it is advantageous to spatially superimpose or register the image data set and the point cloud data set in such a manner that the point cloud data and image data from the overview camera are stored with respect to one another in an internal data memory of the vehicle, for example, with the result that an exact position can be assigned to an object in the image by means of the point cloud.

In one embodiment of the method according to the invention, visible light is captured by means of the overview camera. This is an advantage because many objects are clearly discernible in the visible spectrum, for example objects with a different color than the environment.

In another embodiment of the method according to the invention, infrared and/or ultraviolet light is captured by means of the overview camera. This is an advantage because electrical operating means heated during operation, for example, are easily discernible as heat sources with respect to the environment outside the visible spectrum, in particular by means of thermal radiation in the IR range.

In another embodiment of the method according to the invention, the overview data are obtained at a first time and the detailed images are obtained subsequently at a second time and after the positions of the operating means have been determined. This is an advantage because this approach is particularly simple. The overview data, for example point cloud data and/or image data, are first of all obtained using a first vehicle. These may then be evaluated, for example, off-line after the vehicle returns to the control center and the positions of the operating means of interest can be determined. The installation can then be examined again using the second vehicle in order to capture the detailed images with the detail camera.

In another embodiment of the method according to the invention, the evaluation device is provided in the first vehicle. This is an advantage because the overview data can be processed virtually in real time if the evaluation device is designed accordingly, with the result that, in the case of a single capture operation, for example a single flight over an overhead power line installation, the positions of the operating means can be determined directly and the detailed images can be captured. This saves time, costs and effort for a second capture operation for the detailed images. The evaluation device can be designed with conventional computer devices and data memories.

Additionally or alternatively, the vehicle can collect data sets in a first capture operation by means of the laser scanning device and/or the overview camera and can store said data sets. After the first capture operation, the stored data sets can be read out and processed in order to detect the positions of the operating means and to then plan a second capture operation for the installation. During the second capture operation, the detail camera for aerial photos is then used. For this embodiment, it suffices if the first vehicle for the first capture operation is equipped with the laser scanning device and/or the overview camera and a second vehicle for a second capture operation is equipped only with the detail camera.

In another embodiment of the method according to the invention, the evaluation device is provided in a control center for monitoring the condition. This is an advantage because the determination of the positions of the operating means, as described at the outset, need not be carried out in the vehicle. This makes it possible to save weight and energy consumption in the vehicle, which makes the vehicle comparatively more cost-effective, smaller and usable over longer distances. In one development of this embodiment, a communication connection can be maintained substantially continuously between the vehicle and the evaluation device or control center, with the result that the vehicle transmits the overview data to the evaluation device and receives the presumed positions of the operating means from the evaluation device. In this manner, the detailed images can be directly obtained even in a single capture operation, which saves time, costs and effort for a second capture operation for the detailed images.

In another embodiment of the method according to the invention, a cloud evaluation device is provided. The cloud evaluation device can be provided as a cloud application, for example, and can resort to external computing centers for detecting the positions. It is advantageous for this if the flying object enables permanent data communication, for example by satellite network, for interchanging data with the cloud.

In another embodiment of the method according to the invention, an aerial drone is used as the first and/or second vehicle. An aerial drone in the sense of the invention is an unmanned aircraft. A multicopter drone which, for a capture operation for overview data and/or detailed images, flies comparatively slowly, for example at 30-40 km/h, and at a low height along the installation is suitable, for example. This has the advantage that an unmanned drone precludes the risk which would have to be borne by a human pilot. If there is a crash, for example, only material damage can generally be expected. Like in military drones nowadays for example, the drone can usually be remotely controlled by radio from a control center. It is advantageous if the drone automatically flies over a predefined route at a predefined height. This is particularly cost-effective. In this case, the flight route can be planned, for example in an automated manner, on the basis of development plans of the installation operators.

Alternatively, however, it is also possible to use a conventional flying object such as an airplane or a helicopter with a pilot.

In another embodiment of the method according to the invention, a single vehicle which has the overview sensor arrangement and the detail camera is used as the first and second vehicle. This is an advantage because only a single vehicle is needed to carry out the method. This saves costs in the manufacture and configuration of the vehicle.

In another embodiment of the method according to the invention, the detail camera is used in the same capture operation as the laser scanning device and the overview camera. This is an advantage because the effort for a second capture operation, for example another flyover with an aircraft, is thus dispensed with. The prerequisite for this procedure is that the evaluation device provides an evaluation of the position of the objects to be filmed, for instance operating means, quickly enough so that the detail camera can be immediately directed thereto.

In another embodiment of the method according to the invention, the dimensions of the operating means are additionally determined. This is an advantage because the three-dimensional dimensions are then also known in addition to the position, with the result that the detail camera can be guided, in the case of particularly large objects, in such a manner that these objects can be completely photographed in a reliable manner.

In another embodiment of the method according to the invention, an electrical overhead power line having masts and lines is used as the installation, wherein electrical operating means are arranged on the masts.

In another embodiment of the method according to the invention, electrical insulators on the masts are used as operating means.

In another embodiment of the method according to the invention, the lines are detected using the evaluation device by means of an automatic classification method trained on the basis of sample data, and a simplified line model of the detected lines is created, and the positions of the insulators are respectively detected at the contact point of two modeled lines. This is carried out by initially modeling the line course, that is to say by representing it by means of a so-called catenary or funicular curve. This has been known for a long time and is explained, for example, on Wikipedia: https://de.wikipedia.org/wiki/Kettenlinie_(Mathematik). For example, the connection point of an insulator can be determined from the transition points between points of the class "line" and "mast" or the intersection points of two catenaries of successive line sections. The automatic classification method can capture the lines, for example by means of so-called semantic classification in the recorded point cloud; that is to say, the points in the point cloud data set are assigned to predefined classes—in particular the class "line". This step can be carried out by means of a wide variety of approaches. Machine learning approaches can be mentioned as a possible method. In this case, features which describe the spatial structure are first of all gathered for each point cloud data point and a so-called classifier is then trained in this feature space. A suitable approach for an automatic classification method is known from the publication by Christoph Waldhauser et al., "Automated Classification of Airborne Laser Scanning Point Clouds", Springer Proceedings in Mathematics & Statistics, Vol. 97, pages 269-292, September 2014.

Another suitable approach is known from the publication "Fast semantic segmentation of 3D point clouds using a dense CRF with learned parameters" by Daniel Wolf et al., International Conference on Robotics and Automation, pages 4867-4873, 2015. On the basis of a data set of images of an interior, the described method is able to detect objects and to consider, in particular, that particular objects, for example a chair and a table, can often be found arranged in a manner spatially close together. Applied to the present example of an overhead power line, an insulator can be expected, for example, where a mast and a line have also been detected.

The publication "Fast semantic segmentation of 3d point clouds with strongly varying density" by Timo Hackel et al., ISPRS Annals—ISPRS Congress, Prague, 2016, also deals with the topic of detecting objects in point cloud data sets.

In another embodiment of the method according to the invention, the lines and the masts are detected using the evaluation device by means of an automatic classification method trained on the basis of sample data, and a simplified line model of the detected lines and masts is created, and the positions of the insulators are detected at the contact point of the masts with the lines. Analogously, the same solution approaches as explained for the previous embodiment can be used.

In another embodiment of the method according to the invention, the position of an operating means on a mast is estimated using the evaluation device by determining, on the basis of a previously known position of the mast and an already captured section of a line to this mast, the position of the operating means at an intersection point of a line course extrapolated from the section with a vertical line through the position of the mast. This embodiment has the advantage of estimating the positions which are of interest and are to be monitored on a mast to a certain extent in an anticipatory manner even before the overview sensor arrangement has captured this mast. The detail camera can therefore already begin to collect detailed images as it approaches the relevant mast. This increases the probability of at least one of the detailed images representing the operating means to be monitored in higher resolution and in good visibility conditions. The anticipatory orientation of the detail camera therefore increases the reliability of the condition monitoring and therefore the availability of the installation.

In one development of the above-mentioned embodiment, an already captured mounting height of the line is taken into account by determining the position of the operating means at an intersection point of the extrapolated line course with a horizontal plane at the mounting height. This is an advantage because it improves the quality of the position determination.

In an alternative embodiment of the method according to the invention, the position of an operating means on a mast is estimated using the evaluation device by determining, on the basis of a previously known position of the mast and an already captured mounting height, the position of the operating means at an intersection point of a vertical line through the position of the mast with a horizontal plane at the mounting height. This embodiment has the advantage that, after capturing data relating to a mast in a row of masts of an overhead power line, the positions of the operating means can already be estimated if the mounting height is similar in each case. This is the case in flat terrain, for example. In the case of undulating or mountainous terrain, a height profile can be taken into account in such a manner that a mounting height which differs from mast to mast can also be processed.

In another embodiment of the method according to the invention, as an alternative or in addition to the operating means, at least one of the further objects is detected and is captured with detailed images: signs on the masts, anomalies on the lines, attachments on the line and/or the masts, anomalies on a mast, birds' nests. In this case, the further objects are analogously detected and the positions of these objects are stored in the same manner as described at the outset for insulators.

In another embodiment of the method according to the invention, the detected operating means are assigned to spatial clusters on the basis of their position by means of the evaluation device in order to reduce the number of required orientation operations of the detail camera by means of the clusters. The detail camera or the lens is designed in such a manner that, with knowledge of typical insulator dimensions for example, the insulator is captured in full format and in its entirety in the image. The practice of recording groups of insulators or clusters in the case of insulators which are close together in order to reduce the setting positions of the detail sensor system saves time and costs during data capture.

In another embodiment of the method according to the invention, the operating means are detected on the basis of the image data set by means of the evaluation device, wherein the respective positions of the operating means are determined on the basis of sample data taking into account the point cloud data set. This approach of directly detecting insulators or other objects in the image data uses back projection into the 3-D space using the known relationship of the image with respect to the coordinates provided by the point cloud data set. For example, it is possible to pursue an approach as described by Joseph Redmon et al. in the publication "You Only Look Once: Unified, Real-Time Object Detection.", Conference on Computer Vision and Pattern Recognition (CVPR), 2016, pages 779-788. In this case, the algorithm can be trained directly with sample images of operating means and the like, recorded from different perspectives.

A similar and likewise suitable approach is known from the publication "Faster R-CNN: Towards real-time object detection with region proposal networks" by Shaoquing Ren, Advances in neural information processing systems (pages 91-99), 2015.

On the basis of known arrangements for manually capturing high-resolution aerial photos of installations, the invention is also based on the object of specifying an arrangement which can be used to monitor a condition of an installation in an automated and comparatively fast and cost-effective manner.

The invention achieves this object by means of an arrangement as claimed. Further embodiments emerge from the dependent claims. The same advantages as explained at the outset for the method according to the invention analogously arise for the arrangement according to the invention and its embodiments.

BRIEF DESCRIPTION OF THE DRAWINGS

The invention shall be described below, for better explanation, on the basis of exemplary embodiments and associated schematic figures, in which.

DETAILED DESCRIPTION OF INVENTION

Figure 1:
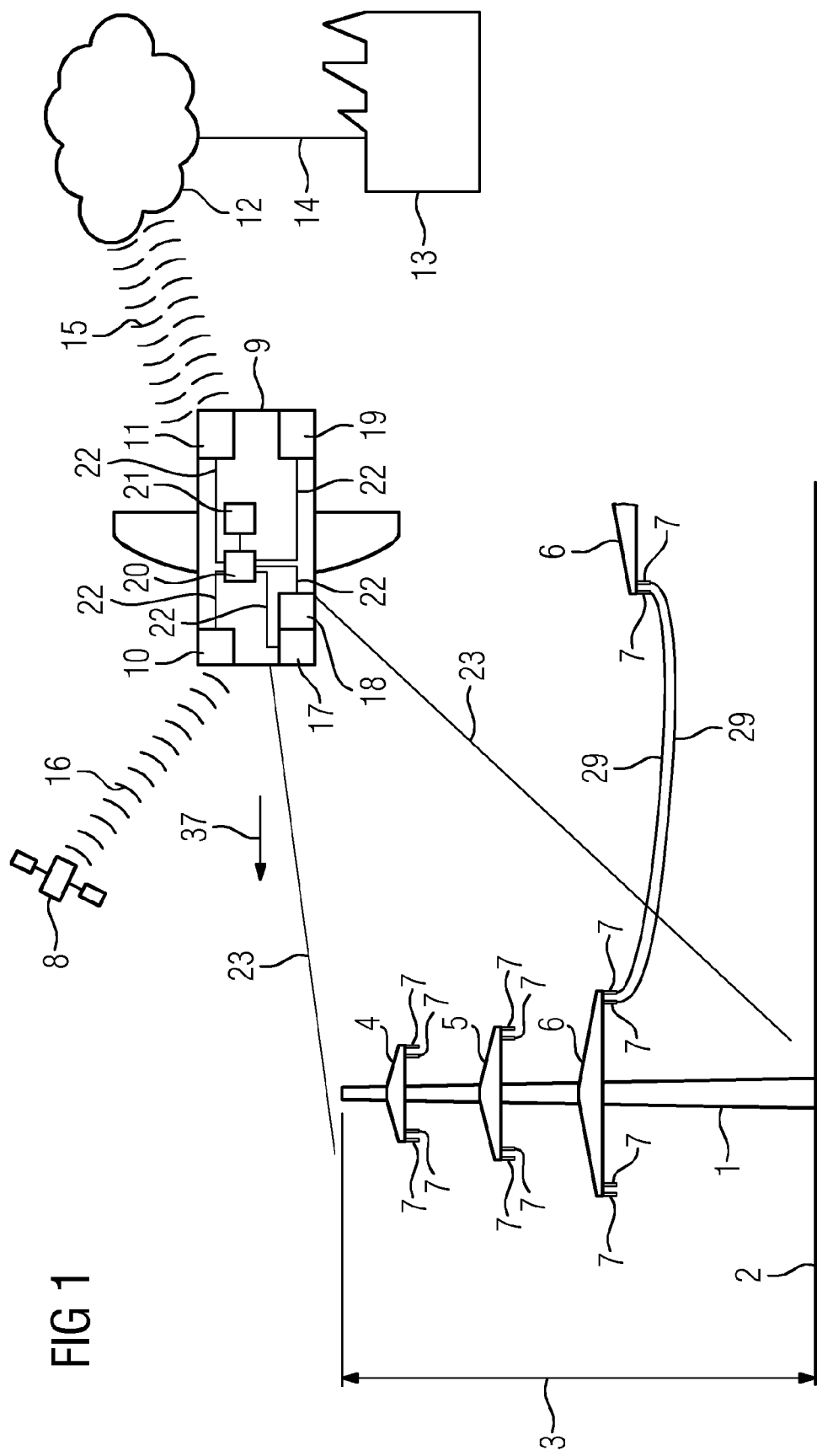
FIG. 1 shows an exemplary embodiment of an arrangement according to the invention.

FIG. 1 shows an exemplary embodiment of an arrangement according to the invention for monitoring a condition of an installation with operating means 7. In this example, the installation is high-voltage masts 1 with high-voltage overhead power lines 29 which are braced between the masts 1. The masts 1 stand freely on the ground 2. In this case, the masts 1 have a typical height 3. A mast 1 is schematically illustrated in the left-hand part of FIG. 1. It has three transverse members 4, 5, 6 at different heights, from each of which two insulators 7 are suspended. The high-voltage overhead power lines 29 are fastened to the insulators 7. For reasons of clarity, only two overhead power lines 29 are illustrated.

A flying object 9 is used to obtain detailed images of the insulators 7. Damage to the insulators 7 can be detected manually or by machine on the basis of detailed images, with the result that maintenance or replacement of a damaged insulator 7 can be carried out in good time even before an insulator fails.

The flying object 9 is an unmanned drone which automatically flies over the installation having masts 1 and overhead power lines 29. The drone 9 has a position detection device 10 which receives "Global Positioning System (GPS)" signals 16 from a GPS satellite 8 and therefore can determine the position of the flying object at any given time in a highly accurate manner. The flying object 9 has an overview sensor arrangement 17, 18 which is in the form of an overview camera 17 and a laser scanning device 18. The flying object 9 also has a detail camera 19. The detail camera 19, the overview camera 17, the laser scanning device 18 and the position determination device 10 are connected to a computer device 20 via data communication lines 22. The computer device 20 is connected to a data memory 21 via a data communication line 22. The computer device 20 is also connected, via a data communication line 22, to a communication device 11 which is connected to a communication network 12 via radio signals 15. The communication network 12 has, for example, a cloud platform in which data from the flying object can be evaluated. The communication network 12 is connected, via a communication connection 14, to a control center 13 in which flight data, overview data obtained by means of the overview sensor device 17, 18 and detailed images which have been obtained by means of the detail camera 19, for example, are permanently stored and are provided for further processing.

The method of operation of the flying object 9 shall now be briefly explained in more detail below. When flying over a high-voltage mast 1, the accordingly oriented overview sensor arrangement 17, 18 has a viewing angle 23 which has a wide angle and can represent the entire height of the mast 1. The positions of the insulators 7 can be estimated by means of the computer device 20 from the overview data, that is to say images from the overview camera 17, and point cloud data from the laser scanning device 18. The detail camera 19 can then be accordingly oriented with respect to the insulators with a comparatively narrow viewing angle (not illustrated) in order to obtain detailed images. A telephoto lens can be used, for example. The detailed images are transmitted to the control center 13 by means of the communication device 11 via the network 12.

Figure 2:
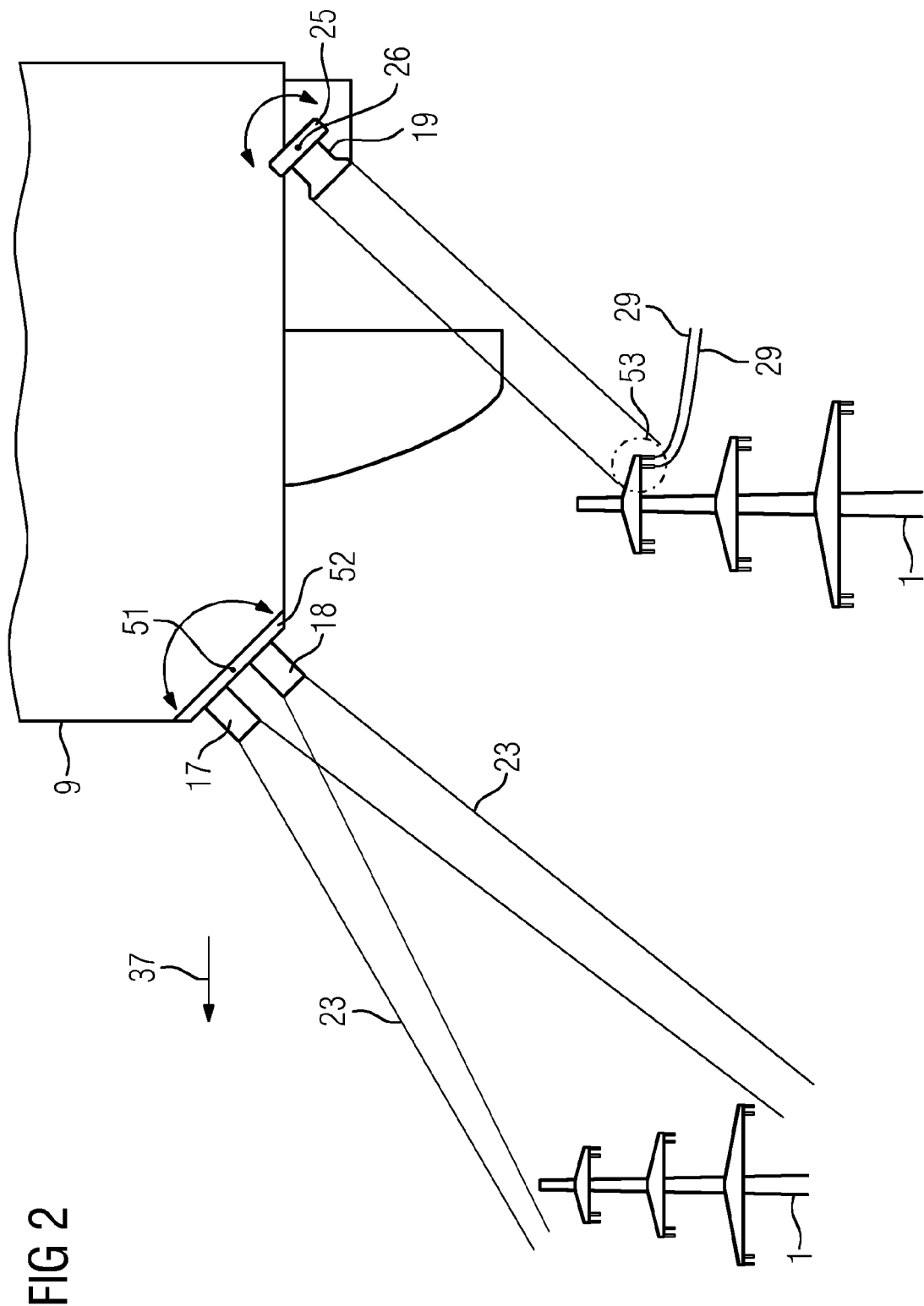
FIG. 2 shows a detailed view of a flying object according to the arrangement from FIG. 1.

FIG. 2 shows a detailed view of the flying object 9 which is equipped with a first pivoting arrangement 52 at the front in the flying direction 37. The first pivoting arrangement 52 is fastened at a first suspension point 51 and makes it possible to jointly orient the overview camera 17 fitted to the pivoting arrangement 52 and the laser scanning device 18. Suitably orienting the first pivoting arrangement 52 results in a viewing angle 23 which can be used to capture an entire mast 1. If the position of the operating means of interest or insulators 7 has been estimated, the detail camera 19 fitted somewhat further back on the flying object can be oriented. The detail camera 19 is arranged for this purpose on a second pivoting arrangement 25 with a second suspension point 26 and can be oriented with respect to the presumed position 53 of an operating means in a highly precise manner in order to obtain detailed images.

Figure 3:
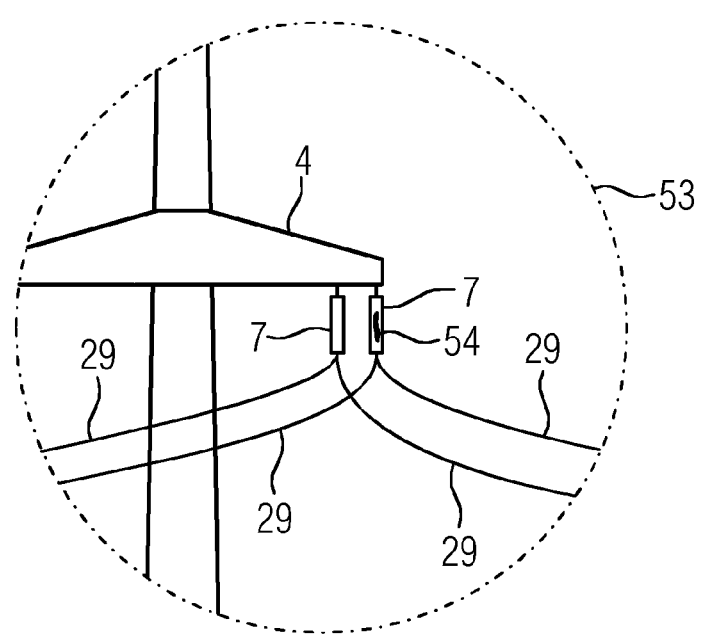
FIG. 3 shows an enlarged image section of a high-voltage mast with insulators according to FIG. 1.

FIG. 3 shows an enlarged detailed view of the presumed position 53 at which two insulators 7 are situated. One of the insulators 7 has damage 54 which can be seen in accordingly high-resolution detailed images. By evaluating the detailed images, it is possible to detect the damage 54 in good time and to replace the insulator 7. This increases the reliability and availability of the energy network whose part is the overhead power line.

Figure 4:
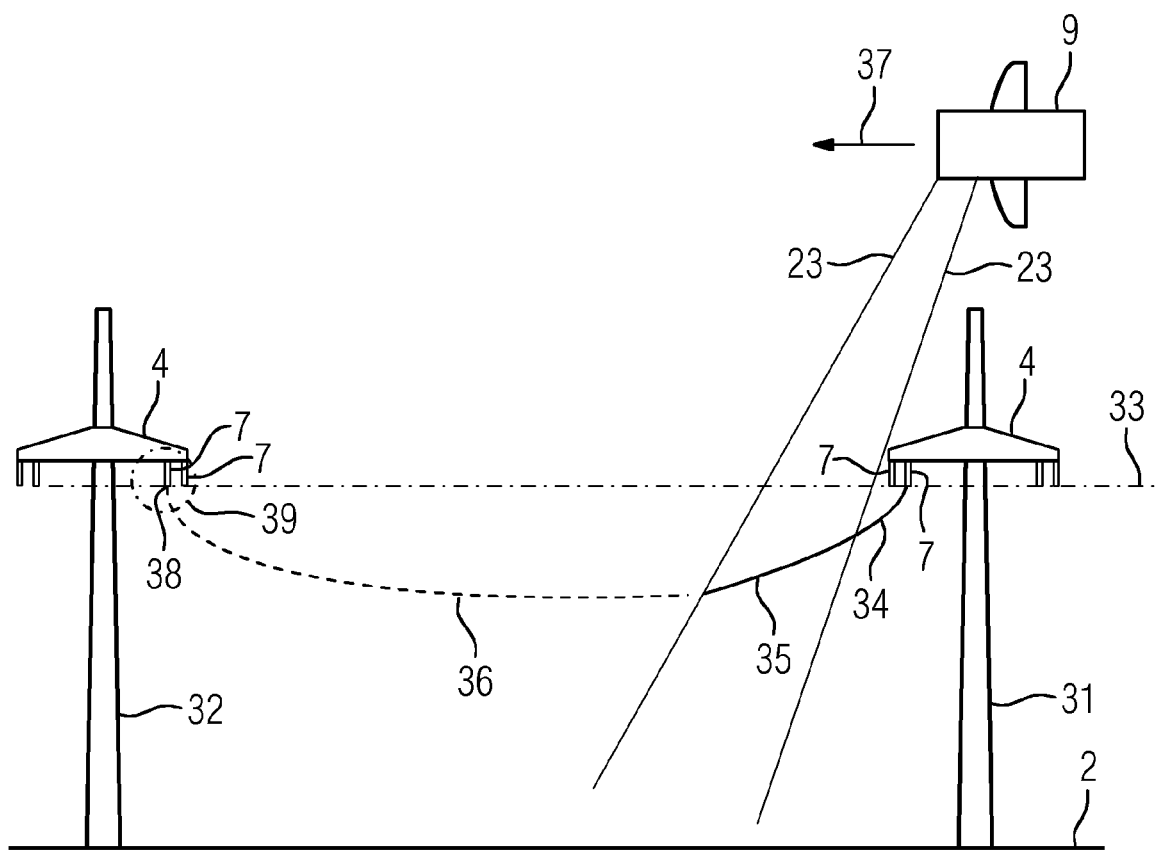
FIG. 4 shows an exemplary embodiment of anticipatory estimation of the position of operating means.

FIG. 4 shows an exemplary embodiment of anticipatory estimation of a position 39 of an insulator 7. The flying object 9 flies parallel to the ground along an overhead power line in the flying direction 37. In this case, it has already captured the mast 31 with the insulator 7 using its overview sensor arrangement. In addition, it has already captured the line section 34 which is fastened to the insulator at a mounting height 33 during the flyby. A further line section 35 is situated in the current viewing angle 23 of the overview sensor arrangement. An evaluation device (not illustrated) can be used to extrapolate a course of a sagging overhead power line, which is indicated by means of the dashed curve 36, on the basis of the now known line sections 34 and 35. All GPS positions of the masts are typically previously known from recordings by the energy network operator, with the result that the position of the masts 32 adjacent in the flying direction 37 is also known to the flying object 9. If the extrapolated line course 36 is now extended to an intersection point 38 with a line running vertically through the mast 32, a position 39 of the insulator 7 on the mast 32 can accordingly be presumed without the flying object 9 already having captured this region.

Additionally or alternatively, it is possible to presume the position 39 at an intersection point of a horizontal plane, that is to say a plane running parallel to the ground 2, at the mounting height 33 with the vertical line through the mast 32 and/or with the extrapolated line course.

This method in its different variants provides the advantage that the overview camera can already be oriented with respect to the region 39 of interest during a first approach to the mast 32 in order to possibly already capture and store first detailed images. The more detailed images are recorded from different viewing angles as the flying object 9 approaches, the sooner damage to the insulator 7 can be detected or possibly a poor image quality on account of disadvantageous light or weather conditions can be compensated for.

The invention claimed is:

1. A method for monitoring a condition of an installation with operating means, comprising:
   capturing overview data by a first vehicle having an overview sensor arrangement for optically capturing the installation,
   detecting the operating means in the overview data by an evaluation device and determining the positions of the operating means by taking into account the position of the first vehicle, and
   generating detailed images of the operating means by a second vehicle having a detail camera which is oriented with respect to the respective positions of the operating means;
   wherein an electrical overhead power line having masts and lines is used as the installation, wherein the operating means comprise electrical operating means arranged on the masts;
   wherein the operating means comprise electrical insulators on the masts; and
   wherein the lines are detected using the evaluation device by an automatic classification method trained on the basis of sample data, and a simplified line model of the detected lines is created, and the positions of the insulators are respectively detected at a contact point of two modeled lines.

2. The method as claimed in claim 1, wherein a laser scanning device for capturing a point cloud data set is used for the overview sensor arrangement.

3. The method as claimed in claim 1, wherein an overview camera for capturing an image data set is used for the overview sensor arrangement.

4. The method as claimed in claim 1, wherein the overview data are obtained at a first time and the detailed images are obtained subsequently at a second time and after the positions of the operating means have been determined.

5. The method as claimed in claim 1, wherein the evaluation device is provided in the first vehicle.

6. The method as claimed in claim 1, wherein the evaluation device is provided in a control center for monitoring the condition.

7. The method as claimed in claim 1, wherein an aerial drone is used as the first and/or the second vehicle.

8. The method as claimed in claim 1, wherein a single vehicle which has the overview sensor arrangement and the detail camera is used as the first and second vehicle.

9. The method as claimed in claim 1, wherein the lines and the masts are detected using the evaluation device by an automatic classification method trained on the basis of sample data, and a simplified line model of the detected lines and masts is created, and the positions of the insulators are detected at a contact point of the masts with the lines.

10. The method as claimed in claim 1, wherein the position of an operating means on a mast is estimated using the evaluation device by determining, on the basis of a previously known position of the mast and an already captured section of a line to this mast, the position of the operating means at an intersection point of a line course extrapolated from the section with a vertical line through the position of the mast.

11. The method as claimed in claim 1, wherein, as an alternative or in addition to the operating means, at least one of the following further objects is detected and is captured with detailed images: signs on the masts, anomalies on the lines, attachments on the line and/or the masts, anomalies on a mast, birds' nests.

12. The method as claimed in claim 11, wherein the detected operating means and/or further objects are assigned to spatial clusters on the basis of their position by the evaluation device in order to reduce the number of required orientation operations of the detail camera by the clusters.

13. An arrangement for monitoring a condition of an installation with operating means, comprising:

a first vehicle which has an overview sensor arrangement for optically capturing overview data relating to the installation, an evaluation device which is designed to detect the operating means in the overview data and to determine the positions of the operating means taking into account the position of the first vehicle, and a second vehicle which is designed to generate detailed images of the operating means using a detail camera which is oriented with respect to the respective positions of the operating means;

wherein the operating means comprise electrical insulators on the masts; and wherein the evaluation device is designed to detect the lines by an automatic classification method trained on the basis of sample data and to create a simplified line model of the detected lines and to respectively detect the positions of the insulators at a contact point of two modeled lines.

14. The arrangement as claimed in claim 13, wherein the overview sensor arrangement has a laser scanning device for capturing a point cloud data set.

15. The arrangement as claimed in claim 13, wherein the overview sensor arrangement has an overview camera for capturing an image data set.

16. The arrangement as claimed in claim 13, wherein the first vehicle is designed to obtain the overview data at a first time, and wherein the second vehicle is designed to obtain the detailed images at a subsequent, second time and after the positions of the operating means have been determined.

17. The arrangement as claimed in claim 13, wherein the evaluation device is provided in the first vehicle.

18. The arrangement as claimed in claim 13, wherein the evaluation device is provided in a control center for monitoring the condition.

19. The arrangement as claimed in claim 13, wherein the first and/or the second vehicle is/are an aerial drone.

20. The arrangement as claimed in claim 13, wherein the first and second vehicles are the same vehicle which has the overview sensor arrangement and the detail camera.

21. The arrangement as claimed in claim 13, wherein the installation has an electrical overhead power line having masts and lines, wherein the operating means comprise electrical operating means arranged on the masts.

22. The arrangement as claimed in claim 13, wherein the evaluation device is designed to detect the lines and the masts by an automatic classification method trained on the basis of sample data and to create a simplified line model of the detected lines and masts and to detect the positions of the insulators at a contact point of the masts with the lines.

23. The arrangement as claimed in claim 13, wherein the evaluation device is designed to estimate the position of an operating means on a mast by determining, on the basis of a previously known position of the mast and an already captured section of a line to this mast, the position of the operating means at an intersection point of a line course extrapolated from the section with a vertical line through the position of the mast.

* * * * *